United States Patent [19]

Noe et al.

[11] Patent Number: 5,541,755
[45] Date of Patent: Jul. 30, 1996

[54] METHOD FOR READJUSTING A PHASE OR FREQUENCY MODULATION SHIFT OF AN OPTICAL TRANSMISSION SIGNAL

[75] Inventors: Reinhold Noe, Paderborn; Franz Auracher, Baierbrunn, both of Germany

[73] Assignee: Siemens Aktiengesellschaft, Munich, Germany

[21] Appl. No.: 315,614

[22] Filed: Sep. 30, 1994

[30] Foreign Application Priority Data

Sep. 30, 1993 [DE] Germany .................. 43 33 405.9

[51] Int. Cl.$^6$ ................................. H04B 10/08
[52] U.S. Cl. .............. 359/110; 359/140; 359/183; 250/227.12
[58] Field of Search ........................ 359/110, 138, 359/140, 182–183, 187–188; 356/345; 250/227.12, 227.27; 385/14, 24

[56] References Cited

U.S. PATENT DOCUMENTS 4,805,235  2/1989  Henmi ........................... 359/182

FOREIGN PATENT DOCUMENTS 0505048  9/1992  European Pat. Off. ............ 359/182
0041043  2/1990  Japan .................................. 359/182

OTHER PUBLICATIONS

"Polarisation–Insensitive, 500 Mbit/s FSK Transmission Over 153km By Passive Polarisation Switching" by R. Noe et al., Electronics Letters, 5th Jan. 1989, vol. 25, No. 1 pp. 4–5.

"Direct Modulation 565 Mb/s DPSK Experiment with Endless Polarization Control and 60.5 Db Loss Span", by E. Meissner et al., Proc. ECOC 92, Paper We A827, Berlin 1992.

"4Gbit/s, 233–km Optical Fibre Transmission Experiment Using Newly Proposed Direct–Modulation PSK", by T. Naito et al, Electronics Letters, vol. 26, 1990, No. 20, pp. 1734–1736.

"2.5 Gbit/s PSK Homodyne System with Nonlinear Phase–Locked Leep", by E. Cottwald et al., Proc. ECOC, pp. 331–334, Amsterdam 1992.

"AMI Signal Format for Pattern–Independent FSK Heterodyne Transmission and Two Channel Crosstalk Measurements", by R. Noe et al., Proc. ECOC '88, Band 1, pp. 175–178 Brighton.

"A Compact 2.5–Gbit/sec Optical Transmitter module with a LiNbO$_3$ Mach–Zehnder Modulator", by K. Suzuki et al., Proc. OFC '92, paper WM3, vol. 1, p. 169.

"1 Gbit/s Bipolar Optical FSK Transmission Experiment Over 121 km of Fibre", by R. S. Vodhanel, Electronics Letters, vol. 24, 1988, No. 3, pp. 163, 165.

Related German Text entitled "Ein Frequenzstabiler Optischer Mehrkanalsender", by W. H. Rech.

"Engineered 565 Mb/s DPSK Heterodyne Receiver with a Sensitivity 53.5 dBm," by E. Meissner et al., Proc. EFOC/Lan 1992, Paper 123, pp. 378–381, Paris, 1992.

Primary Examiner—Leo Boudreau
Assistant Examiner—Kinfe-Michael Negash
Attorney, Agent, or Firm—Hill, Steadman & Simpson

[57] ABSTRACT

Apparatus and methods are disclosed for readjusting a modulation shift of a transmission light modulated optical signal. In these systems and methods, a first modulated portion of the modulated transmission light is removed to obtain a first modulated signal which is divided into first and second light beams. The first light beam is delayed by a specific delay time and the first and second light beams are coherently superimposed to obtain an optical superposition signal which is detected to produce a detector signal that is proportional to a power of the superposition signal. An error signal is subsequently generated from the detector signal which is representative of a modulation shift from a desired shift value which is used for substantially correcting a modulation of the transmission light.

30 Claims, 4 Drawing Sheets

METHOD FOR READJUSTING A PHASE OR FREQUENCY MODULATION SHIFT OF AN OPTICAL TRANSMISSION SIGNAL

BACKGROUND OF THE INVENTION

1. Field of the Invention

The present invention relates generally to the field of optical communications systems and, more particularly, the present invention relates to a method for readjusting the phase or frequency modulation shift of an optical transmission signal.

2. Description of the Related Art

Various modulation schemes for optical communications systems are known in the art. Frequency or phase modulation are utilized in optical communications technology in addition to intensity or amplitude modulation. One type of frequency modulation is binary frequency shift keying or (FSK). In FSK or CPFSK, (Continuous Phase Frequency Shift Keying) the optical signal is represented by the time-dependent equation for field strength normed to an amplitude value of 1:

$$E(t) = \cos\left(\omega_0 \cdot t + \int_{-\infty}^{t} d(\zeta)(1-\epsilon)\Delta\omega d\zeta\right) \quad (1)$$

Where $\omega_0$ is the optical frequency of the optical oscillation and $\Delta\omega$ is the frequency shift which can be ideally achieved between the two symbols, also known as the rated or desired shift value. $\epsilon$ is zero when the ideal shift or rated shift is set and is not equal to zero when the frequency shift deviates from the rated shift value by $\Delta\omega$ whereby the deviation from the rated shift value is established by $\epsilon \cdot \Delta\omega$ and the equation $|\epsilon| \ll 1$ usually applies.

Normally, the signal is in Non-Return-to-Zero (NRZ) format wherein $d(t)=0$ is valid for a binary "0" and $d(t)=1$ is valid for a transmitted binary symbol "1" during the entire duration of a bit T (see for example, R. S. Vodhanel, Electronics Letters, Vol. 24 No. 3, pp. 163–165 (1988). In some situations, a binary "1" is represented by alternate positive and negative frequency shifts (see R. Noe et al. Proc. ECOC Vol. 1 pages 175–188 (1988) Brighton). This is referred to as Alternate Mark Inversion or AMI. In an AMI-FSK signal, $d(t)=0$ is valid for a transmitted binary "0" and $d(t)=1$ or $d(t)=-1$ is valid alternately for a transmitted binary "1" during the entire duration of a bit T. Some applications require bipolar FSK rather than AMI-FSK, however, because the signal statistics of AMI-FSK and bipolar FSK are identical, a control modulation shift which is designed for AMI-FSK is also suitable for bipolar FSK.

Another modulation scheme for use in optical communications is binary Phase Shift Keying PSK (see for example, E, Gottwald et al. Proc. ECOC Amsterdam at 331–34 1990). Binary Differential Phase Shift Keying, or DPSK is also used in such systems. (see E. Meisner, H. Rodler, Proc. EFOC/LAN Paris paper 123 at 378–81 1992; T. Naito et al. Electronics Letters, Vol. 26 No. 20 at 1734–1736 1990; E. Meisner et al. Proc. ECOC, paper We A8.2, Berlin 1992). Phase modulation for these systems may be accomplished by either modulation of the phase in an external modulator (see i.e. E. Gottwald et al. Proc. ECOC Amsterdam at 331–334 (1990); E. Meisner, H. Rodler Proc. EFOC/LAN Paris paper 123, at 378–81 (1992) or directly by modulation of the transmission light with a signal that corresponds to the first chronological derivation of the desired phase (see T. Naito et al. Electronics Letters, Vol. 26 No. 20 at 1734–1736 1990; E. Meisner et al. Proc. ECOC, paper We A8.2, Berlin 1992). This relationship is known because the phase is the integral of the radian frequency of the transmission light. In the second form of presentation, the transmission light is represented by Equation 1 above. Equation (2), $\Delta\omega \cdot T = \pi$ is selected so that the phase shift or rated shift value is achieved within T of a bit based on frequency shift amounts to $\pi$ insofar as the pulse integral $d(t)$ is the same over the duration T of the bit.

When each phase shift is in the same direction, it is considered PSK or DPSK. If a phase modulator is to be used, it must have an infinite range because an arbitrary range of binary symbols "1" may occur over time. Generally, this phase shift is accomplished by applying a short current pulse to the semiconductor laser that generates the transmission light. The frequency is briefly modified as a result of the phase shift and returns to its original value after the end of the pulse which varies the phase. (see T. Naito et al. Electronics Letters, Vol. 26 No. 20 at 1734–1736 1990). For a transmitted binary symbol without phase shift, $d(t)=0$ is valid and for a transmitted binary symbol having a phase shift, $d(t)$ is a pulse having the area T that is preferably short in order to achieve rapid phase shifting.

In many applications the phase shifts have alternate positive and negative polarity. For example, this is true where a phase modulator is driven with an NRZ signal (see. E. Gottwald et al. Proc. ECOC Amsterdam at 331–334 (1990); T. Naito et al. Electronics Letters, Vol. 26 No. 20 at 1734–1736 1990). Direct modulation of a laser on the basis of alternating positive and negative pulses is also possible (see E. Meisner et al. Proc. ECOC paper We A8.2 Berlin 1992). For a transmitted binary symbol without phase shift, $d(t)=0$ applies for a transmitted binary symbol with phase shift, $d(t)$ is a pulse that comprises the area T or alternately $-T$, this being optimally short in order to achieve faster phase shifting.

In known frequency and phase modulation systems for optical communication systems, the phase modulation or frequency modulation shift varies as a result of a variety of influences so that the communication transmission quality of an optical waveguide link deteriorates over time. The present invention provides a solution to this problem. Although binary modulation schemes are described for the purpose of practicing the invention, it will be understood that the invention is also suitable for multi-stage digital, analog frequency or phase modulation systems as well.

SUMMARY OF THE INVENTION

The present invention improves upon the prior art optical communications systems and provides a technical advance by setting forth a method for readjusting the phase or frequency shift with respect to a rated shift value in an optical communications system having a varying shift of the phase or frequency modulation of the transmitter.

Additional features and advantages of the present invention are described in, and will be apparent from, the following detailed description of the presently preferred embodiments and from the drawings.

DETAILED DESCRIPTION OF THE PRESENTLY PREFERRED EMBODIMENTS

Figure 1:
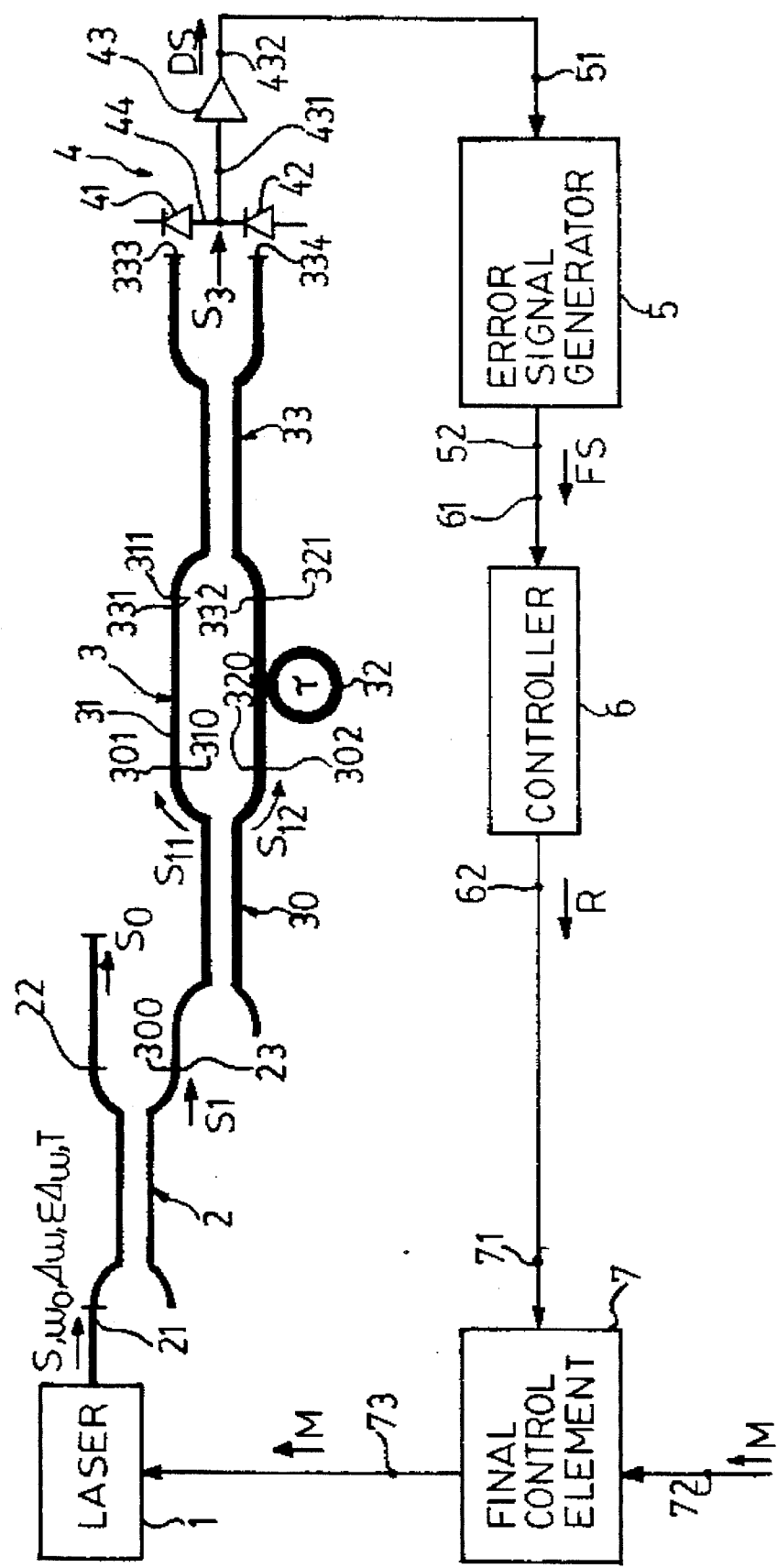
FIG. 1 illustrates a schematic block diagram of a first exemplary embodiment of the present invention.
Figure 5:
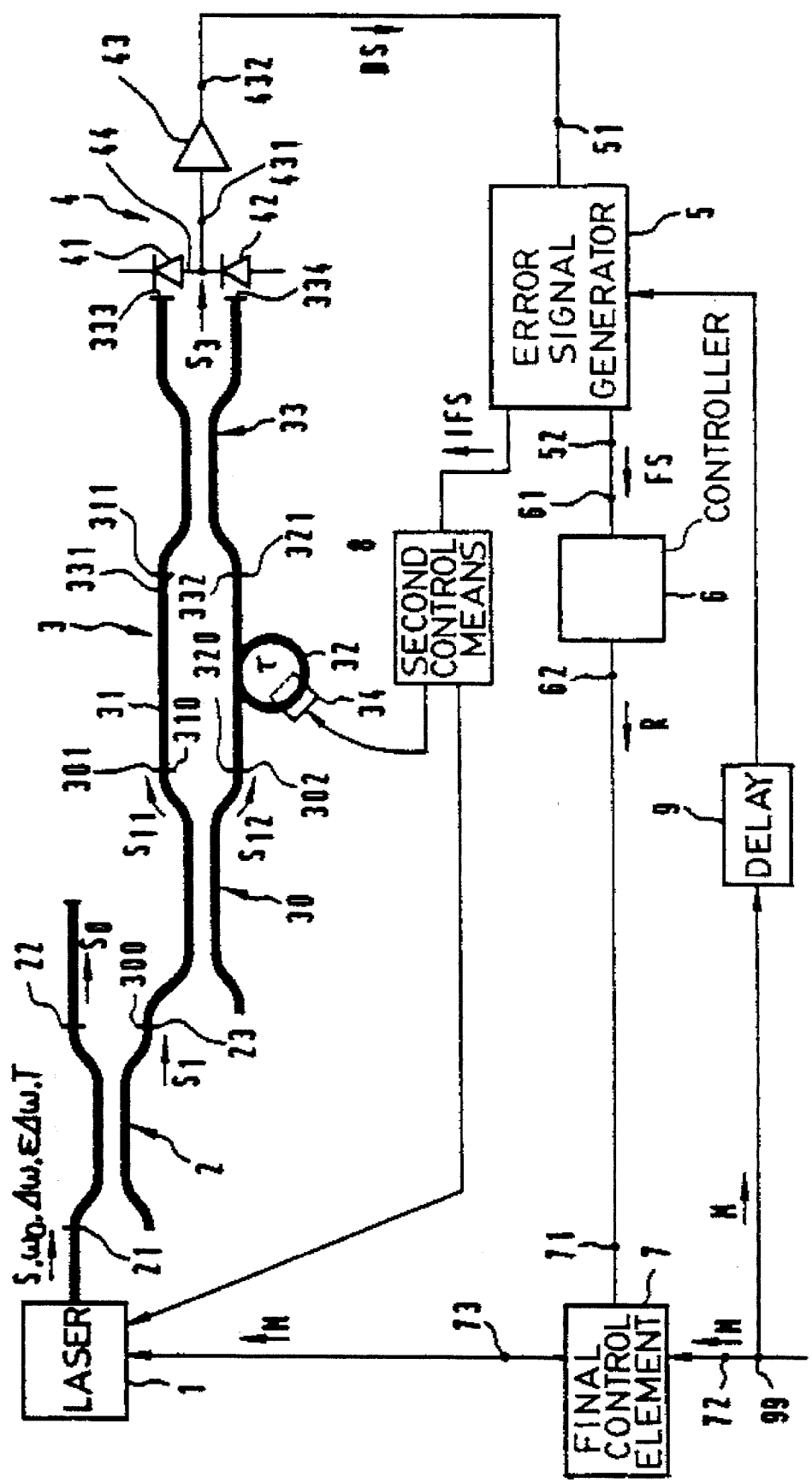
FIG. 5 illustrates a schematic block diagram of a second exemplary embodiment of a communication system which embodies the present invention.

FIGS. 1 and 5 illustrate an optical transmitter for performing the method of the present invention. In each illustration, a semiconductor laser 1 generates a transmission light S and an optical coupler 2 separates a portion of the laser light $S_1$ from the transmission light S. An optical interferometer 3 generates a superposition signal $S_3$ from the portion of laser light $S_1$ that contains information about a shift deviation $\epsilon \cdot \Delta\omega$ from a rated shift value $\Delta\omega$ that may exist in the transmission light S. A detector 4 detects the superposition signal $S_3$ coupled out from the interferometer 3 and generates a detector signal DS that is proportional to the power of the superposition signal output $S_3$.

An error signal generator 5 generates a shift error signal FS that is at least approximately proportional for shift deviations $\epsilon \cdot \Delta\omega$ that are smaller than a predetermined deviation amount $|\epsilon_o \cdot \Delta\omega|$. A controller 6 receives the shift error signal FS as actual value and applies an output control signal R to a control element which varies the frequency and/or phase modulation such that the frequency and/or phase modulation shift of the transmission light is regulated approximately to the rated shift value $\Delta\omega$ for a shift deviation $\epsilon \cdot \Delta\omega$ as indicated by the error signal FS. The frequency and/or phase modulation of the transmission light S may be done directly via the optical transmitter 1 if the optical transmitter is a laser transmitter or alternatively an external modulator contained in the transmitter may supply the shift. A modulation signal M drives the transmitter or external modulator to provide the shift. In the examples illustrated in FIGS. 1 and 5, the final control element modifies the amplitude and/or pulse duration of the modulation signal M such that the rated shift value $\Delta\omega$ is subsequently set in the transmission light S. The optical coupler 2 has an input 21 for coupling the transmission light S into the coupler 2 and a first output 22 for coupling a portion $S_o$ of the modulated transmission light S out and a second output 23 for coupling a portion $S_1$ from the modulated transmission light S out of the coupler 2.

The optical interferometer 3 comprises an input 300 for coupling the light signal $S_1$ into the interferometer 3 and an optical power splitter 30 for splitting the input light signal $S_1$ into two beams $S_{11}$, $S_{12}$. Optical paths 31 and 32 separately guide the two light beams $S_{11}$, $S_{12}$ to a heterodyning means 33 which coherently superimposes the two light beams $S_{11}$, $S_{12}$ for the purpose of generating superpositions signal $S_3$. The heterodyning means 33 has outputs 333, 334 for coupling the superposition signal $S_3$ out of the interferometer 3. Two optical paths of the interferometer 31, 32 are of different lengths such that the two light beams $S_{11}$, $S_{12}$ are delayed relative to one another by a specific delay time $\tau$ after traversing the optical paths 31, 32.

In the examples illustrated by FIGS. 1 and 5, the coupler 2 and the interferometer 3 are shown as optical waveguides. Alternatively, they may be unguided beam optics. In order to accomplish the desired superposition in the interferometer 3, the interferometer 3 should be designed as a polarization preserving interferometer.

A detector 4 generates a detector signal DS which is proportional to the optical power of the superposition signal $S_3$. The detector comprises two series-connected photodetectors 41 and 42 and an optical amplifier 43. The portion of the superposition signal $S_3$ coupled out from the output 333 of the interferometer 3 is supplied to the photodetector 41 and the portion of the superposition signal $S_3$ coupled out from the output 334 of the interferometer 3 is supplied to the photodetector 42. An input 431 of the amplifier 43 is connected to an electrical connecting line 44 that connects the two photodetectors 41, 42 and provides the detector signal DS. An output 432 of the amplifier 43 which provides the amplified detector signal DS is connected by an electrical line to an input 51 of the error signal generator 5.

An output 52 of the error signal generator 5 provides the shift error signal FS and is connected to an actual value input 61 of the controller 6. The controller 6 has an output 62 for the regulating signal R. The output 62 is connected to a control input 71 of the final control element 7. The modulation signal M is supplied to the final control element 7 via an input 72 and the potentially modified modulation signal M is available at an output 73 of the final control element 7 which is then supplied to the transmitter 1.

For clarity, operation of the interferometer 3 will be examined for the case where only one photodetector 41 or 42 is present. The signal incident on the photodetector either 41 or 42 is composed of two electrical field strength portions which have traversed the optical paths 31 and 32 of the interferometer 3. One of these signals is delayed by a defined delay $\tau$ relative to the other. As previously indicated, the interferometer is preferably manufactured of components which maintain the polarization of the signals so that the two electrical field strength components coherently add. The photo-current of the corresponding photodetector 41, or 42 is proportional to the optical power of the signal $S_3$ i.e. proportional to the square of the field strength. As a result of the coherent addition, a mixed term that corresponds to the product of the two field strengths arises in the squaring and results in the following equation:

$$DS = <k \cdot E(t) \cdot E(t-\tau)> = k/2 \cdot \qquad (3)$$

$$\cos\left(\omega_0 \cdot \tau + \int_{t-\tau}^{t} d(\zeta) \cdot (1-\epsilon) \cdot \Delta\omega \cdot d\zeta\right)$$

Where k is a constant and <> references the chronological average over periods of the optical frequency $\omega_o$. When $\tau$ and/or $\omega_o$ is properly selected and utilized such that the symbols d(t) at the transmitter side are known, then DS may be evaluated as a phase detector. Alternatively, the detector DS may also be evaluated with a frequency meter or discriminator for long delay times τ. In the exemplary embodiment illustrated in FIG. 1, the error signal generator 5 is designed such that the phase difference between the delayed and the undelayed light beam in the interferometer 3 is utilized.

When τ is selected such that τ>>T, the optical frequencies of the delayed and undelayed light beams $S_{11}$, $S_{12}$ can each be respectively constant but differ over a longer period of time when NRZ-FSK modulation is used. For example, when a string of transmitted binary symbols "1", i.e. d(t)=1 t>$t_0$ follows a string of transmitted binary symbols "0", i.e., d(t)=0 for t<$t_0$. In this example, this is valid for $t_0$<t <$t_0$+τ. The detector signal DS according to Equation (3) above is a sinusoidal alternating signal with the difference frequency of the signals in the two optical paths 31 and 32 of the interferometer 3. Similarly, alternating signals may also occur with unipolar PSK or DSPK when, for example, a string of binary symbols having a phase shift., i.e. d(t) has the pulse area T for t<$t_0$ follows a longer period of binary symbols without phase change, i.e., d(t)=0 for t<$t_0$.

The average frequency of these oscillations is respectively (1−ε)Δω, from which the shift error signal FS may be derived. Fundamentally, the principle is also applicable for AMI-FSK and bipolar PSK and DPSK as well.

In this method, the detector signal is highly dependent on the statistical properties of the binary transmission signal, i.e., on the occurrence of binary symbol changes and on the occurrence of the individual binary symbols. In a closed control circuit, this can lead to an undesired variation of the frequency shift and/or phase shift that is dependent on the modulation signal. As a rule, however, the signal properties are constant and known. For example, such as a binary random sequence so that this method can nonetheless be employed. Knowledge of the actual transmission signal can be consciously utilized in order to achieve independence of the shift error signal FS and of the shift from the modulation signal.

Figure 2:
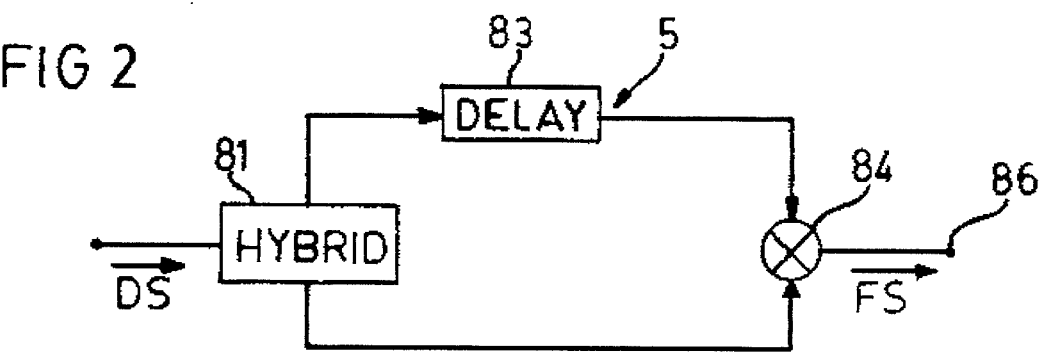
FIG. 2 illustrates schematic block diagram of a first exemplary embodiment of the error signal generating means of FIG. 1 embodied as a frequency discriminator.

FIG. 2 shows a first exemplary embodiment of an error signal generator circuit 5 for the exemplary embodiment illustrated in FIG. 1 where the error signal generator is embodied as an electrical frequency discriminator. In the frequency discriminator of FIG. 2, the detector signal DS is divided into two equal power signals in a 90° electrical hybrid 81. One of the two divided signals is delayed by a defined time $τ_1$ in a delay element 83. The two divided signals are multiplied in a multiplier 82 for a detector signal DS in the form of cos(Δt), the divided signals output from the hybrid 81 are proportional to cos(ωt) and sin(ωt) and are proportional to COS(ω(t−$τ_1$)) and sin(ωt) after delay of one of the divided signals. The low frequency portion of the error signal FS at the output 86 of the multiplier 84 is therefore proportional to sin(ω·$τ_1$). When $τ_1$ is selected such that Δω·$τ_1$=π then the error signal FS is proportional to ε for small deviations of the frequency and/or phase modulation shift from the rated or desired shift value.

Figure 3:
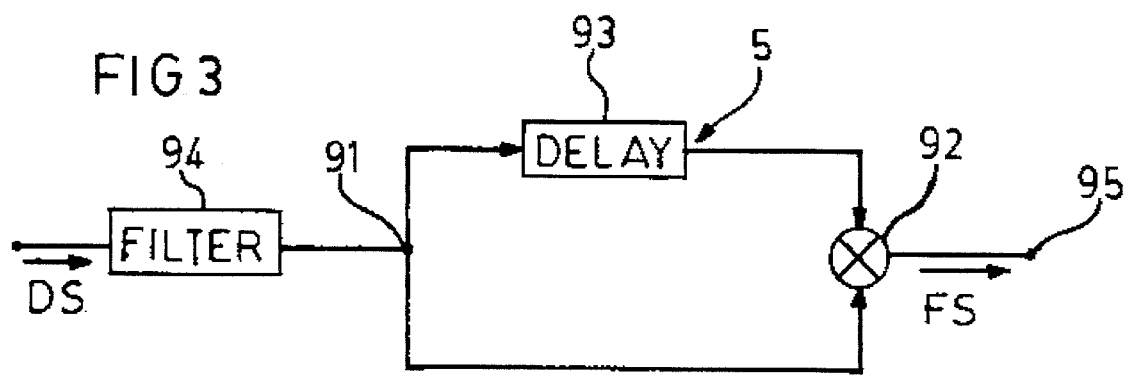
FIG. 3 illustrates a schematic block diagram of a second exemplary embodiment of the error signal generating means of FIG. 1 embodied as a frequency discriminator.

FIG. 3 illustrates another example of an error signal generator circuit 5 for the exemplary embodiment set forth in FIG. 1 embodied as a frequency discriminator. In the exemplary embodiment illustrated in FIG. 3, the detector signal DS is first conducted through a high-pass filter 94 for filtering out unwanted lower frequencies. The filtered detector signal is divided into two equal power signals by a power divider 91. One of the divided signals is delayed by a specific delay time $τ_1$ in the delay element 93. The two divided signals are then multiplied in a multiplier 92. For a detector signal DS in the form of cos(ω·t) the divided signals following the delay element 93 are proportional to cos(ω(t−$τ_1$)) and cos(ω·t). The low-frequency portion of the shift error signal FS at the output 95 of multiplier 92 is therefore proportional to cos(ω·$τ_1$). When $τ_1$ is selected such that Δω·$τ_1$=π/2 applies then the shift error signal is proportional to ε for small deviations of the frequency and/or phase modulation shift from the rated shift value Δω. For the frequency discriminator set forth in FIGS. 2 and 3, a zero position of the discriminator characteristic of these frequency discriminators is at the rated shift value Δω. The circuits set forth in FIGS. 2 and 3 are known from R. S. Vodhanel, Electronics Letters, Vol. 24, No. 3, at pages 163–165 (1988); R. Noe et al, Electronics Letters, Vol. 25, No. 1, at pages 4–5 (1989).

Figure 4:
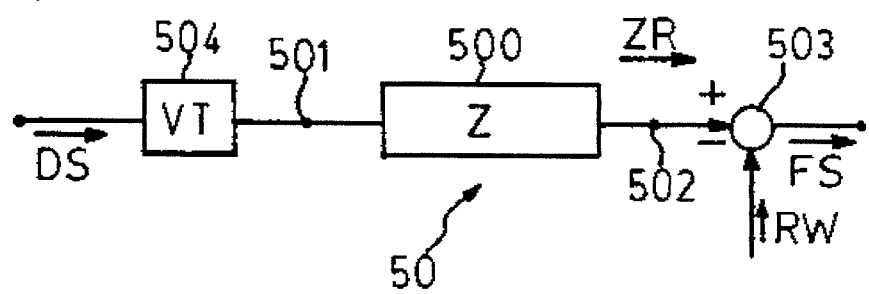
FIG. 4 illustrates a schematic block diagram of an exemplary embodiment of the error signal generating means of FIG. 1 embodied as a frequency meter.

A frequency meter may also be employed as the error signal generator 5 illustrated in FIG. 1. FIG. 4 illustrates an exemplary embodiment of a frequency meter wherein a digital frequency counter 500 is employed. Similar frequency measurements are disclosed in W. H. Rech "Ein frequenzstabiler optischer Mehrkanalsender" Dissertation at the Electrical Engineering Faculty of Karlsruhe University, 1991.

In the exemplary embodiment illustrated in FIG. 4, the frequency counter 500 comprises a counting input 501 which receives the detector signal DS and a result output 502 from which a proportional count result ZR is available. The proportional count result ZR is at least approximately proportional to a difference between the rated shift value Δω and a shift deviation ε·Δω. The shift error signal FS may be derived from this count result ZR. The frequency counter 500 is preceded by a frequency divider 504 for dividing the frequency of the detector signal DS by a specific numeric value so that the input frequency range of the frequency counter 500 does not become excessively large. The frequency divider 504 supplies the detector signal DS, having its frequency divided by this value to the counting input 501 of frequency counter 500. When a reference quantity RW is subtracted in a subtracter 503 from the count result ZR, which is proportional to (1−ε)·Δω, then the shift error signal FS output from the subtracter 503 again is proportional to ε as desired.

A phase difference between a delayed and undelayed signal can also be interpreted when Δω·τ=π (equation 4) is at least approximately selected for that purpose where τ=T is valid at the same time for PSK and DPSK. Then, based on knowledge of the transmitted binary symbols, the detector signal DS may be evaluated or sampled and a type of phase detector may be generated. For example, by sampling equation (3) at times t, wherein d(t)=0 is valid, the value: $DS_0$=(k/2)·cos($ω_0$·τ) (Equation 5) may be obtained, the value $$DS_1^{+=}(k/2)\cdot\cos((ω_0+(1-ε)Δω)\cdot τ) \qquad (6)$$

can be obtained at times t wherein d(t)=1 is valid for FSK or, respectively, $$\int_{t-T}^{t} d(ζ)\cdot dζ = T$$

is valid for DSK and DPSK, and the value $$DS_{\overline{1}}=(k/2)\cdot\cos((ω_0+(1-ε)\cdot Δω)\cdot τ) \qquad (7)$$

can be obtained at times t wherein $$\int_{t-T}^{t} d(\zeta) \cdot d\zeta = -T.$$

The embodiment illustrated in FIG. 5 differs from the embodiment of FIG. 1 in that the error signal generator 5 generates a product error signal IFS in addition to generating the shift error signal FS. The product error signal IFS is supplied as an actual value to a second control means 8 that at least approximately or substantially corrects the product $\omega_o \cdot \tau$ of the transmission light optical frequency $\omega_o$ and the specific delay time $\tau$ of the interferometer 3. The correction is made with reference to a rated product value given a deviation of the product $\omega_o \cdot \tau$ from the rated product value indicated by the product error signal IFS. This may be done either by varying the optical lengths of the paths 31 or 32 of the interferometer 3 and/or by varying the optical frequency $\omega_o$. In FIG. 5, the final control element 34 serves the purpose of varying the optical length of optical path 32. The optical frequency may be adjusted by altering the transmitter 1.

Figure 6:
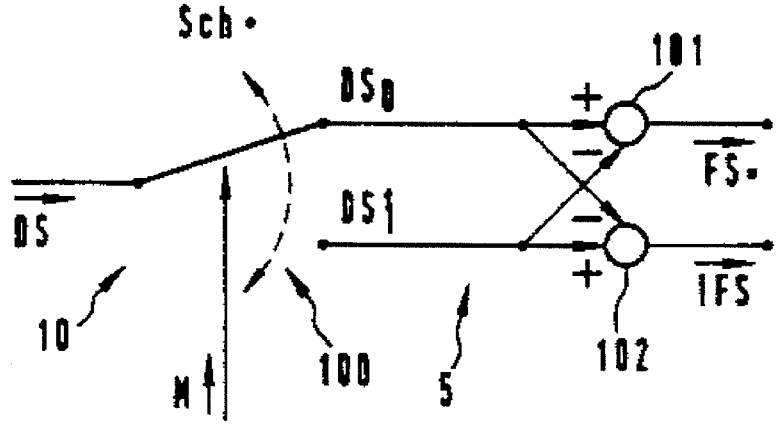
FIG. 6 is a schematic diagram of a first exemplary embodiment of the error signal generating means for the communication system set forth in FIG. 5.
Figure 7:
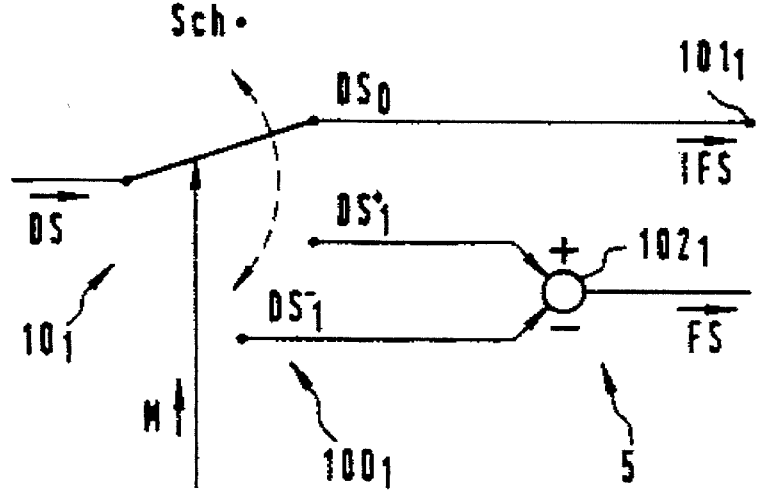
FIG. 7 is a schematic block diagram of a second exemplary embodiment of the signal generating means for the communication system of FIG. 5.
Figure 8:
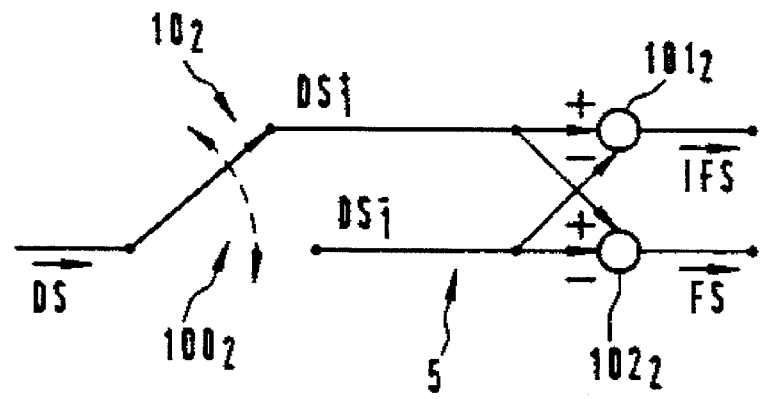
FIG. 8 is a schematic diagram of a third exemplary embodiment of the error signal generating means of FIG. 5.

The error signal generator 5 of the exemplary embodiment found in FIG. 5 is designed such that these values may be obtained. Various exemplary embodiments of the error signal generator 5 are shown in FIGS. 6 through 8, wherein a switch 100, 100', or 100", respectively can be switched into one of several switch positions dependent on the modulation signal M such that the signals $DS_0$, $DS_1^+$ and $DS_1^-$ are produced. In general, the modulation signal M and/or the detector signal DS must be delayed so that the signal running time of the modulation signal M from a branch point 91 to the switch means 100, 100' or, respectively, 100" and the signal running time from the branch point 99 through the final control element are the same length. This is achieved in FIG. 5 through the delay element 9.

First, $\omega_0 \cdot \tau$ must be appropriately selected. Two signals, a shift error signal FS which is proportional to $\epsilon$ and a product error signal IFS, which is at least approximately proportional to the deviation of the product $\omega_0 \cdot \tau$ from the value required for the correct acquisition of the shift error signal FS, may be acquired from the equations (5) through (7), potentially by forming sums or differences. IFS is supplied to a control means that controls the length difference in the interferometer 3 such that it is proportional to $\tau$ or the transmission frequency $\omega_0$ of the laser transmitter 1 such that the product $\omega_0 \cdot \tau$ assumes the desired value.

For NRZ-FSK and unipolar PSK and DPSK, the requirement for acquiring the shift error signal FS is equal to $(\omega_0+(1-\epsilon)\cdot\Delta\omega/2)\cdot\tau=n\cdot\pi$, whereby n is a whole number.

$$FS=DS_1^+ + DS_0$$

and $$IFS=DS_1^+ - DS_0,$$

is valid for the shift error signal FS and for the product error signal IFS, whereby FS is proportional to $\epsilon$ and IFS is proportional to $\omega_0 \cdot \tau$ when $|\epsilon|\ll 1$.

FIG. 6 illustrates an exemplary embodiment of an error signal generator 5 for producing the shift error signal FS and the product error signal IFS. The error signal generator comprises a signal adder 101 and a substracter 102. For AMI-FSK and bipolar PSK and DPSK, $\omega_0 \cdot \tau=(n+\frac{1}{2})\cdot\pi$ is necessary for acquiring the shift error signal, where n is a whole number.

$$FS=DS_1^+ - DS_1^-$$

and $$IFS=DS_0 \text{ or } IFS=DS_1^+ + DS_1^-$$

is valid for the shift error signal FS and for the product error signal IFS. FS is also proportional to $\epsilon$ and IFS is proportional to $\omega_0 \cdot \tau$ when $|\epsilon|\ll 1$.

For this case, FIG. 7 shows an exemplary embodiment of the error signal generator 5 for the former alternative and FIG. 8 shows an exemplary embodiment of the error signal generator 5 for the second alternative. Compared with the more complicated calculations of the second alternative, the first alternative is preferred by employing $DS_0$ as IFS.

In FIG. 7, 101' denotes an output for the product error signal IFS and 102' denotes a signal subtracter and, in FIG. 8, 101" denotes a signal adder and 102" denotes a signal subtracter.

The present invention is subject to many variations and modifications and changes and detail it is intended all matter described throughout the specification and shown in the accompanying drawings be considered illustrative only. Accordingly, it is intended that the invention be limited only by the spirit and scope of the appended claims.

We claim:

1. A method for readjusting the modulation shift of a transmission light modulated with reference to a rated shift value comprising the steps of:

a) separating a portion of the modulated transmission light to obtain a modulated signal;

b) dividing the modulated signal into first and second light beams;

c) delaying the first light beam by a specific delay time;

d) coherently superimposing the first and second light beams to obtain an optical superposition signal;

e) detecting the superposition signal to produce a detector signal that is proportional to a power of the superposition signal;

f) generating an error signal from the detector signal representative of a modulation shift from a desired shift value; and g) substantially correcting a modulation of the transmission light on the basis of the error signal.

2. The method for readjusting the modulation shift of a transmission light of claim 1, wherein the polarization of the first and second light beams is maintained in said step of dividing the first modulated signal into first and second light beams.

3. The method for readjusting the modulation shift of a transmission light of claim 1, wherein the transmission light is phase modulated.

4. The method for readjusting the modulation shift of a transmission light of claim 1, wherein the transmission light is frequency modulated.

5. The method for readjusting the modulation shift of a transmission light of claim 1, wherein a final control element substantially corrects the modulation of the transmission light.

6. The method for readjusting the modulation shift of a transmission light of claim 1, wherein a frequency discriminator produces the error signal from the detector signal.

7. The method for readjusting the modulation shift of a transmission light of claim 1, wherein a frequency meter produces the error signal from the detector signal.

8. The method for readjusting the modulation shift of a transmission light of claim 1, wherein a first modulation signal modulates the transmission light and wherein said step of substantially correcting the modulation of the transmission light is done independently of the first modulation signal.

9. The method for readjusting the modulation shift of a transmission light of claim 1, wherein a rated product value of the specific delay time and a frequency of the transmission light is substantially equal to a whole radian number and wherein a product error signal is approximately proportional to a deviation of the product error signal from the rated product value.

10. The method for readjusting the modulation shift of a transmission light of claim 1, wherein the product error signal is supplied to a control means for driving a final control element which modifies the specific delay time such that the product of the optical frequency and the specific delay time is approximately equal to the rated product value.

11. The method for readjusting the modulation shift of a transmission light of claim 1, wherein the transmission light is modulated in NRZ-FSK format.

12. The method for readjusting the modulation shift of a transmission light of claim 1, wherein the transmission light is modulated in unipolar PSK format.

13. The method for readjusting the modulation shift of a transmission light of claim 1, wherein the transmission light is modulated in unipolar DPSK format.

14. The method for readjusting the modulation shift of a transmission light of claim 1, wherein the transmission light is modulated in AMI-FSK format.

15. The method for readjusting the modulation shift of a transmission light of claim 1, wherein the transmission light is modulated in bipolar PSK format.

16. An apparatus for readjusting the modulation shift of a transmission light modulated with reference to a rated shift value comprising:

an optical coupler means for coupling a first portion of the transmission light to provide a modulated signal;

an optical interferometer means for receiving the modulated signal, splitting the modulated signal into first and second light beams, delaying said first light beam and superimposing the first and second light beams to provide a superposition signal;

a detector means for detecting the superposition signal and providing a detected signal output;

an error signal generator means for receiving the detected signal output and generating an error signal based on the detected signal; and means for correcting the modulation shift of the transmission light on the basis of the error signal connected to a laser transmission source.

17. The apparatus for readjusting the modulation shift of a transmission light modulated with reference to a rated shift value of claim 16, wherein the optical interferometer is designed to maintain a polarization of the first modulated signal.

18. The apparatus for readjusting the modulation shift of a transmission light modulated with reference to a rated shift value of claim 16, wherein the detector means further comprises at least one photodetector.

19. The apparatus for readjusting the modulation shift of a transmission light modulated with reference to a rated shift value of claim 16, wherein the means for correcting the modulation shift further comprises a control means which receives the error signal and provides a control signal which is applied to a final control element which adjusts a modulation shift of the transmission light.

20. The apparatus for readjusting the modulation shift of a transmission light modulated with reference to a rated shift value of claim 16, wherein a modulator of the transmission light is controlled by a modulation signal and wherein a final control element varies a modulation shift of the transmission signal by altering the modulation signal.

21. The apparatus for readjusting the modulation shift of a transmission light modulated with reference to a rated shift value of claim 16, wherein a semiconductor laser generates the transmission light.

22. The apparatus for readjusting the modulation shift of a transmission light modulated with reference to a rated shift value of claim 16, wherein the error signal generator means further comprises a frequency discriminator.

23. The apparatus for readjusting the modulation shift of a transmission light modulated with reference to a rated shift value of claim 22, wherein the frequency discriminator has a static discriminator characteristic that comprises a zero position at a rated shift value.

24. The apparatus for readjusting the modulation shift of a transmission light modulated with reference to a rated shift value of claim 22, wherein the frequency discriminator further comprises a power divider means for dividing the detector signal into first and second equal-power signals, delay means for delaying the first equal-power signal by a predetermined time period and a multiplier for multiplying the first and second equal-power signals to provide a shift error signal.

25. The apparatus for readjusting the modulation shift of a transmission light modulated with reference to a rated shift value of claim 24, wherein the power divider means is a 90 hybrid.

26. The apparatus for readjusting the modulation shift of a transmission light modulated with reference to a rated shift value of claim 24, wherein a high-pass filter is located at an input of the power divider means.

27. The apparatus for readjusting the modulation shift of a transmission light modulated with reference to a rated shift value of claim 16, wherein the error signal generating means comprises a frequency meter.

28. The apparatus for readjusting the modulation shift of a transmission light modulated with reference to a rated shift value of claim 27, wherein the frequency meter further comprises a frequency counter means for receiving the detector signal and providing a result output for calculating a proportional count result.

29. The apparatus for readjusting the modulation shift of a transmission light modulated with reference to a rated shift value of claim 28, wherein the result output is applied to the input of a subtractor for subtracting a reference value from the count result.

30. The apparatus for readjusting the modulation shift of a transmission light modulated with reference to a rated shift value of claim 28, wherein a frequency divider means divides the detector signal and provides an input to the frequency counter means.

* * * * *